US011947846B2

(12) United States Patent
Nagase

(10) Patent No.: US 11,947,846 B2
(45) Date of Patent: Apr. 2, 2024

(54) MEDIA PROCESSING DEVICE TO DETERMINE AN ERROR IN RECEIVED COMMAND AND METHOD FOR CONTROLLING MEDIA PROCESSING DEVICE

(71) Applicant: SEIKO EPSON CORPORATION, Tokyo (JP)

(72) Inventor: Daigo Nagase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/325,202

(22) Filed: May 30, 2023

(65) Prior Publication Data

US 2023/0384991 A1 Nov. 30, 2023

(30) Foreign Application Priority Data

May 31, 2022 (JP) .................................. 2022-088363

(51) Int. Cl.
*G06F 3/12* (2006.01)
*G03G 15/00* (2006.01)

(52) U.S. Cl.
CPC ............ *G06F 3/121* (2013.01); *G06F 3/1204* (2013.01); *G06F 3/1255* (2013.01); *G03G 15/70* (2013.01)

(58) Field of Classification Search
None
See application file for complete search history.

(56) References Cited

U.S. PATENT DOCUMENTS

| 11,733,946 B2* | 8/2023 | Saito | G06F 3/1285 |
| | | | 358/1.14 |
| 2009/0201540 A1* | 8/2009 | Morooka | G06F 3/121 |
| | | | 358/1.15 |
| 2012/0081735 A1* | 4/2012 | Matsuda | G06K 15/402 |
| | | | 358/1.14 |
| 2018/0267755 A1* | 9/2018 | Okazawa | G06F 3/121 |
| 2020/0034087 A1* | 1/2020 | Iida | G06F 3/127 |

FOREIGN PATENT DOCUMENTS

JP 2016-128215 A 7/2016

* cited by examiner

*Primary Examiner* — Haris Sabah
(74) *Attorney, Agent, or Firm* — WORKMAN NYDEGGER

(57) ABSTRACT

A media processing device includes a communicator communicable with an external device, and a controller configured to, in response to receiving, by the communicator, a first command including a plurality of pieces of setting information, the setting information including a setting item related to a setting and a setting value associated with the setting item, determine whether the setting information has an error. The controller is configured to, when it is determined that the setting information has the error, in response to receiving, by the communicator, a second command, transmit, by the communicator, response information including first information related to the setting item determined as having the error and second information related to the error.

12 Claims, 5 Drawing Sheets

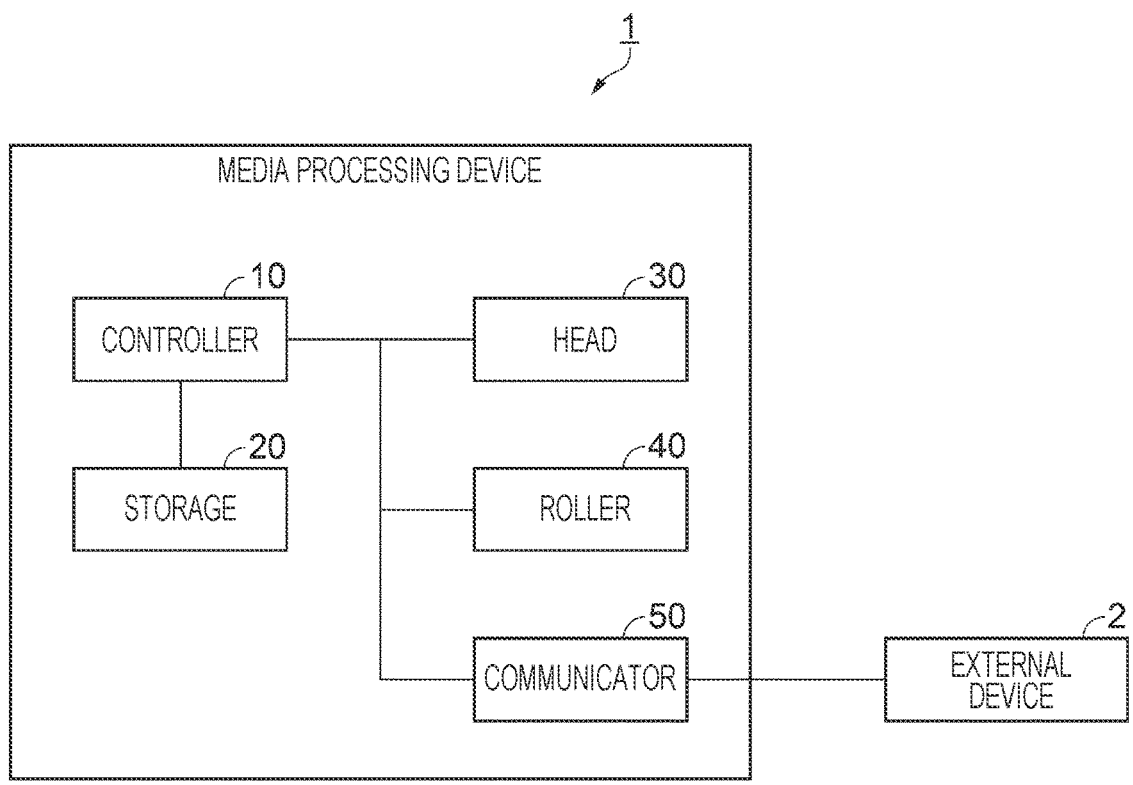

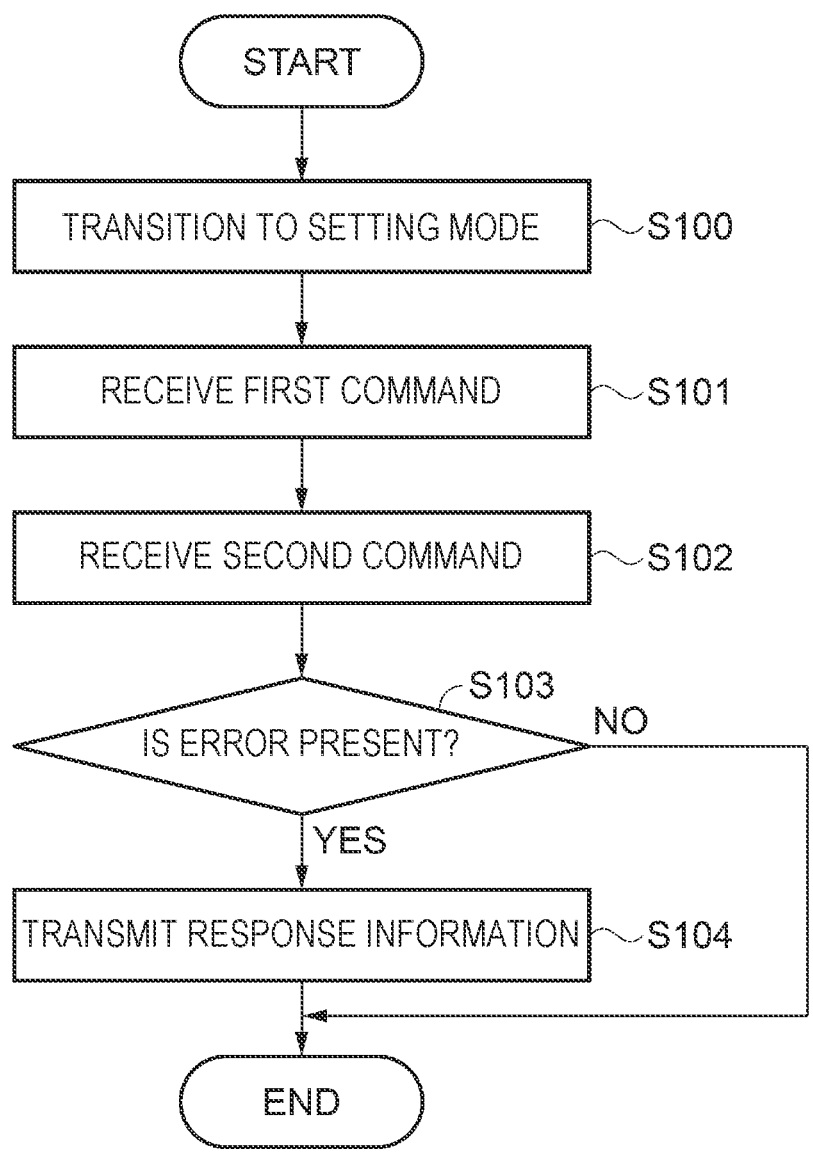

FIG. 4

| No | object | key | | | | | value | |
|---|---|---|---|---|---|---|---|---|
| | | KeyName1 | KeyName2 | KeyName3 | KeyName4 | SetValue | Details | ErrorCode |
| 1 | ValueError | Setting | TcpIpCfg | IpV4 | Ip | 0.0.0.0 | OutOfRange | 100 |
| 2 | ValueError | Setting | Print | Speed | | Level20 | OutOfRange | 000 |
| 3 | ValueError | Setting | NwCSAuth | Password | | XXXXX | WrongPassword | 198 |
| 4 | ValueError | | | | | | NoPassword | 197 |
| 5 | FormatError | | | | | | | |

FIG. 5

```
{
    "ValueError" :
            {
                    "KeyName1"  :  "Setting"      ,
                    "KeyName2"  :  "TcpIpCfg"     ,
                    "KeyName3"  :  "IpV4"         ,
                    "KeyName4"  :  "Ip"           ,
                    "SetValue"  :  "0.0.0.0" ,
                    "Details"   :  "OutOfRange" ,
                    "ErrorCode" :  "100"
            }
}
```

FIG. 6

```
{
    "ValueError" :
            {
                    "KeyName1"  :  "Setting"      ,
                    "KeyName2"  :  "Print"        ,
                    "KeyName3"  :  "Speed"        ,
                    "SetValue"  :  "Level20"      ,
                    "Details"   :  "OutOfRange" ,
                    "ErrorCode" :  "000"
            }
}
```

FIG. 7

```
{
    "ValueError" :
                {
                    "KeyName1"  :  "Setting"       ,
                    "KeyName2"  :  "NwCSAuth"      ,
                    "KeyName3"  :  "Password"      ,
                    "SetValue"  :  "XXXXX"         ,
                    "Details"   :  "WrongPassword" ,
                    "ErrorCode" :  "198"
                }
}
```

FIG. 8

```
{
    "ValueError" :
                {
                    "Details"   :  "NoPassword" ,
                    "ErrorCode" :  "197"
                }
}
```

FIG. 9

```
{
    "FormatError" :  ""
}
```

MEDIA PROCESSING DEVICE TO DETERMINE AN ERROR IN RECEIVED COMMAND AND METHOD FOR CONTROLLING MEDIA PROCESSING DEVICE

The present application is based on, and claims priority from JP Application Serial Number 2022-088363, filed May 31, 2022, the disclosure of which is hereby incorporated by reference herein in its entirety.

BACKGROUND

1. Technical Field

The present disclosure relates to a media processing device and a method for controlling a media processing device.

2. Related Art

As disclosed in JP-A-2016-128215, a known device transmits a plurality of pieces of setting information as a response upon receiving, from an external device such as a computer, a command that requests the plurality of pieces of setting information.

However, when the plurality of pieces of setting information are received from the known device disclosed in JP-A-2016-128215 and one of the plurality of pieces of setting information has an error, the external device has a difficulty in determining which of the plurality of information has an error and what is a factor of the error.

SUMMARY

Provided is a media processing device including a communicator communicable with an external device. The media processing device is configured to receive a first command including a plurality of pieces of setting information, the setting information including a setting item related to a setting and a setting value associated with the setting item, determine whether the first command has an error, transmit response information including first information related to the setting item of the first command determined to have the error and second information related to the error in response to receiving a second command when it is determined that the first command has the error.

Provided is a method for controlling a media processing device including a communicator communicable with an external device. The method includes, receiving a first command including a plurality of pieces of setting information, the setting information including a setting item related to a setting and a setting value associated with the setting item, determining whether the first command has an error, and, transmitting response information including first information related to the setting item of the first command determined to have the error and second information related to the error in response to receiving a second command when it is determined that the first command has the error.

BRIEF DESCRIPTION OF THE DRAWINGS

FIG. 1 is a block diagram illustrating a configuration of a media processing device.

FIG. 2 depicts an example of a first command.

FIG. 3 is a flowchart illustrating a method for controlling the media processing device.

FIG. 4 is a table illustrating an example of response information that the media processing device transmits.

FIG. 5 depicts an example of response information.

FIG. 6 depicts an example of the response information.

FIG. 7 depicts an example of the response information.

FIG. 8 depicts an example of the response information.

FIG. 9 depicts an example of the response information.

DESCRIPTION OF EXEMPLARY EMBODIMENTS

1. Media Processing Device According to First Embodiment 1-1. Configuration of Media Processing Device A media processing device 1 illustrated in FIG. 1 is a line thermal printer that prints, for example, receipts. As illustrated in FIG. 1, the media processing device 1 comprises a controller 10, a storage 20, a head 30, a roller 40, and a communicator 50.

The controller 10 comprises a central processing unit (CPU) that provides overall control of the components of the media processing device 1, a universal asynchronous receiver transmitter (UART) that manages input and output, a field programmable gate array (FPGA) and a programmable logic device (PLD) that are logic circuits, and so on. The CPU may also be referred to simply as a processor.

The storage 20 comprises a flash read-only memory (ROM) and a hard disk drive (HDD) that are rewritable nonvolatile memories, a random access memory (RAM) that is a volatile memory, and so on.

The CPU of the controller 10 reads out programs, such as firmware, stored in the nonvolatile memories of the storage 20 and executes the programs using, as a work area, the RAM of the storage 20.

The communicator 50 is configured with circuitry for communication. The communicator 50 may be a wired one using a Universal Serial Bus (USB) or other connector or may be a wireless one using a WiFi (registered trademark) or other antenna. The communicator 50 is capable of receiving print data and commands from an external device 2 and is also capable of transmitting response information described later to the external device 2.

The external device 2 is, for example, a computer, tablet computer, or smartphone.

The head 30 is, for example, a thermal head. An example of recording paper, which is a medium, is elongated thermal paper. The recording paper, sandwiched between the head 30 and the roller 40, is transported by the roller 40.

In accordance with print data received from the external device 2, the controller 10 causes heat generation by energizing the head 30 over a predetermined energization time period to form dots on the recording paper, so that processing such as printing is performed.

In such a manner, the controller 10 causes the head 30 to perform printing while causing the roller 40 to transport the recording paper.

The recording paper on which printing has been performed by the head 30 is cut by a cutter (not illustrated) having a movable cutter blade and then exits from the media processing device 1.

1-2. Commands

Examples of commands that the media processing device 1 receives from the external device 2 and executes will now be described in detail.

The commands are configured according to the control system of firmware of the media processing device 1. It is assumed that the commands include information added to the commands. It is also assumed that, in the present embodiment, character codes are included in the commands.

A. First Command

A first command is a so-called collective set command, which includes a plurality of pieces of setting information. The structure of a collective set command is represented, for example, as ESC+A+setting information. ESC denotes a command including a subsequent set of information, and A is information indicating that this command is a command for performing a collective setting.

The subsequent setting information is constituted by a combination of a setting item related to a setting of the media processing device 1 and a setting value associated with the setting item. A plurality of setting items may be provided, and the plurality of setting items may be structured in a hierarchical manner.

FIG. 2 depicts an example of setting information, other than ESC+A, included in the collective set command. Here, an example including two pieces of setting information is depicted. As depicted in FIG. 2, in the setting information, the setting items are structured in a hierarchical manner using curly braces ({ }) and the association between a setting item and a setting value is indicated using a colon (:). In addition, as described later, two pieces of setting information are depicted in FIG. 2 and are separated by a comma (,).

In addition, as in FIG. 2 and in FIGS. 5 to 9 depicting response information described later, the format written using curly braces and a colon is referred to as a so-called JavaScript Object Notation (JSON) format. The JSON format is supported in various programming languages and thus enables data to be passed easily between different programming languages.

Using curly braces and a colon, the controller 10 may extract setting items and setting values from setting information.

"Setting", which is the setting item at the top-most level, is referred to also as an object, and other setting items and setting values are referred to also as strings. In addition, a setting item is referred to also as a key, and a setting value is referred to also as a value.

In FIG. 2, "0.0.0.0" and "Level20", which are setting values of the respective pieces of setting information, are values. In addition, the setting items between the object and the value are keys.

The first setting information in FIG. 2 is specifically configured as follows. First, the setting items will be described.

At the first level, which is the top-most level, "Setting", which denotes a setting item related to a setting, is located. At the second level, "TcpIpCfg", which denotes a setting item related to the configuration of Transmission Control Protocol/Internet Protocol (TCP/IP) of networks, is located. At the third level, "IpV4", which denotes a setting item related to Internet Protocol version 4, is located. At the fourth level, which is the bottom-most level, "Ip", which denotes a setting item related to the IP address and is a communication item, is located.

At the last level, "0.0.0.0", which is a setting value associated with the setting items at these levels, is located. Here, "0.0.0.0" is the value of an IP address to be set for the media processing device 1 and is a communication item value.

In addition, the second setting information in FIG. 2 is specifically configured as follows. First, the setting items will be described.

At the first level, which is the top-most level, "Setting", which denotes a setting item related to a setting, is located. At the second level, "Print", which denotes a setting item related to printing, is located. At the third level, which is the bottom-most level, "Speed", which denotes a setting item related to a print speed, is located.

At the last level, "Level20", which is a setting value associated with the setting items at these levels, is located. "Level20" is a print speed value to be set for the media processing device 1 and is represented stepwise as a print speed value level.

When a collective set command is received from the communicator 50, regarding the collective set command, the controller 10 determines that ESC denotes a command including the subsequent set of information, and determines, with A, that this command is a command for collective setting. The controller 10 then makes a determination of the subsequent setting information.

Specifically, the controller 10 determines the first setting information in the collective set command as follows.

The controller 10 determines, in order from top-most to bottom-most levels of the hierarchy, that "Setting" denotes a setting item related to a setting, "TcpIpCfg" is a setting item related to the configuration of TCP/IP of networks, "IpV4" is a setting item related to Internet Protocol version 4, and "Ip" is a setting item related to the IP address, and determines that "0.0.0.0" is a setting value associated with these hierarchical setting items and is an IP address value.

The controller 10 determines that the communication item included in setting items of the setting information is, for example, "Ip". In addition, the controller 10 determines that the communication item value associated with "Ip" is "0.0.0.0". In addition, as described later, "Ip" may be included in first information.

In such a manner, the setting information of the collective set command may include "Ip", which is a setting item as well as a communication item, and include "0.0.0.0", which is a setting value associated with "Ip" and is a communication item value.

The controller 10 may determine that "0.0.0.0" associated with "Ip" is an IP address value to be set for the media processing device 1 by the external device 2, and may set this value in the communicator 50.

In addition, the controller 10 determines the second setting information in the collective set command as follows.

The controller 10 determines, in order from top-most to bottom-most levels of the hierarchy, that "Setting" is a setting item related to a setting, "Print" is a setting item related to printing, and "Speed" is a setting item related to a print speed, and determines that "Level20" is a setting value associated with these hierarchical setting items and is a print speed value.

In such a manner, the setting information of the collective set command may include, as a setting item, "Speed", which is a print speed, and include, as a setting value, "Level20", which is a print speed value associated with "Speed". In addition, as described later, "Speed" may be included in the first information.

The controller 10 may determine that "Level20", which is a setting value associated with "Speed", is a print speed value, and may set the print speed value for the head 30 and the roller 40 to perform printing.

In the storage 20, hierarchical setting items are stored in relation to each other. When a correct collective set command is received, for setting information included in the collective set command, the controller 10 refers to the storage 20 and stores, in the storage 20, setting values in association with the hierarchical setting items.

In the storage 20, a plurality of hierarchical setting items are present, and correct setting values are stored respectively in association with the setting items.

For example, for the first setting information, "Setting", "TcpIpCfg", "IpV4", and "Ip", which are hierarchical setting items, are stored in relation to each other in the storage 20. Then, "0.0.0.0", which is a setting value, is stored, in association with the hierarchical setting items, in the storage 20.

Given that only "Ip" at the bottom-most level is stored as a setting item, "0.0.0.0", which is a setting value, may be stored in association with "Ip" in the storage 20.

In addition, for the second setting information, "Setting", "Print", and "Speed", which are hierarchical setting items, are stored in relation to each other in the storage 20. Then, "Level20", which is a setting value, is stored, in association with the hierarchical setting items, in the storage 20.

Given that only "Speed" at the bottom-most level is stored as a setting item, "Level20", which is a setting value, may be stored, in association with "Speed", in the storage 20.

The controller 10 may read out setting values associated with the hierarchical setting items from the storage 20 and execute various types of settings.

For example, in accordance with the first setting information, the controller 10 refers to the storage 20 and traces the hierarchy regarding the settings for the communicator 50, in order from top-most to bottom-most levels.

Specifically, the controller 10 refers to the storage 20 and traces the hierarchy regarding the settings of the communicator 50, in order from top-most to bottom-most levels, that is, "Setting", which is a setting item related to a setting, "TcpIpCfg", which is a setting item related to the configuration of TCP/IP, "IpV4", which is a setting item related to Internet Protocol version 4, and "Ip", which is a setting item related to the IP address.

The controller 10 may then read out "0.0.0.0", which is a setting value associated with the hierarchical setting items, from the storage 20.

The controller 10 may set "0.0.0.0", which is an IP address read from the storage 20, in the communicator 50. As a result, the communicator 50 may communicate with the external device 2 using "0.0.0.0", which is the set IP address.

Although "0.0.0.0" as the IP address setting value is a wrong value as described later, the description has been given here assuming that this value is a correct value.

In addition, for example, in accordance with the second setting information, the controller 10 refers to the storage 20 and traces the hierarchy regarding a print speed setting, in order from top-most to bottom-most levels.

Specifically, the controller 10 refers to the storage 20 and traces the hierarchy regarding a print speed setting, in order from top-most to bottom-most levels, that is, "Setting", which is a setting item related to the setting, "Print", which is a setting item related to the printing, and "Speed", which is a setting item related to the print speed.

The controller 10 may then read out "Level20", which is a setting value associated with the hierarchical setting items, from the storage 20.

The controller 10 may set "Level20", which is a print speed value read from the storage 20, in the head 30 and the roller 40. As a result, the head 30 and the roller 40 may perform printing on recording paper using "Level20", which is the print speed value that has been set.

In such a manner, the controller 10 may determine a plurality of pieces of setting information included in the collective set command, so that a plurality of settings are made.

Although "Level20" as the print speed setting value is a wrong value as described later, the description has been given here assuming that this value is a correct value.

B. Second Command

A second command is a response-information request command that requests response information described later. In response to receiving, by the communicator 50, a response-information request command, the controller 10 determines whether the collective set command has an error, and if so, transmits response information.

The structure of a response-information request command is represented, for example, as ESC+B. ESC denotes a command including a subsequent set of information, and B denotes that this command is a command that requests response information.

When a response-information request command is received from the communicator 50, regarding the response-information request command, the controller 10 determines that ESC denotes a command including the subsequent set of information, and determines, with B, that this command is a command that requests response information.

The controller 10 then determines whether the collective set command has an error, and if so, transmits response information.

C. Third Command

A third command is a setting-mode transition command that requests transition to a setting mode. In response to receiving, by the communicator 50, a setting-mode transition command, the controller 10 transitions from a normal mode to the setting mode. The normal mode is a mode in which setting with a collective set command is prohibited, and the setting mode is a mode in which setting with the collective set command is permitted.

The structure of a setting-mode transition command is represented, for example, as ESC+C+1. ESC denotes a command including a subsequent set of information, C denotes that this command is a command for mode switching, and 1 indicates a request for transition from the normal mode to the setting mode.

When the setting-mode transition command is received from the communicator 50, regarding the setting-mode transition command, the controller 10 determines that ESC denotes a command including the subsequent set of information, determines, with C, that this command is a command for mode switching, and determines, with 1, that a request is made for transition from the normal mode to the setting mode. The controller 10 then transitions from the normal mode to the setting mode.

In such a manner, in response to receiving, by the communicator 50, the setting-mode transition command, the controller 10 transitions to the setting mode and receives a collective set command to enable settings based on setting information to be made. In other words, the controller 10 transitions to the setting mode which enables settings based on the setting information of the collective set command in response to receiving the setting-mode transition command. However, in the setting mode, the controller 10 disallows printing of print data. Even when print data is received by the communicator 50, the controller 10 discards the print data and does not perform printing.

A normal-mode transition command requesting transition from the setting mode to the normal mode is also prepared. The structure of a normal-mode transition command is represented, for example, as ESC+C+0.

The differences from the setting-mode transition command will be mainly described. In the normal-mode transition command, 0 located at the end indicates transition from the setting mode to the normal mode. When the normal-mode transition command is received, the controller 10 determines that 0 is a request for transition from the setting mode to the normal mode, and transitions from the setting mode to the normal mode.

In the normal mode, even when a collective set command is received by the communicator 50, the controller 10 discards the collective set command and does not perform the settings. In contrast, when print data is received by the communicator 50, the controller 10 performs printing.

1-3. Method for Controlling Media Processing Device According to First Embodiment With reference to FIG. 3, a method for controlling the media processing device 1 will be described. The controller 10 is assumed to be in the normal mode. As described above, in the normal mode, even when a collective set command is received by the communicator 50, the controller 10 discards the collective set command and does not perform the settings.

In response to receiving, by the communicator 50, the setting-mode transition command, which is the third command, the controller 10 transitions from the normal mode to the setting mode (S100). The controller 10 receives a collective set command to enable settings based on setting information to be made.

With or without the third command, the controller 10 may cause a transition between the normal mode and the setting mode in response to a user operation on a panel switch, sensor, power switch, or any combination thereof (not illustrated) of the media processing device 1.

The controller 10 receives, by the communicator 50, a collective set command, which is the first command (S101).

In response to receiving, by the communicator 50, the response-information request command, which is the second command (S102), the controller 10 determines whether the collective set command has an error (S103), and if so (YES in S103), transmits response information (S104).

Note that, the collective set command includes a plurality of pieces of setting information, and, if the controller 10 determines that at least any one piece of the setting information has an error, the controller 10 transmits response information.

However, if the controller 10 determines that the collective set command has no error (No in S103), the controller 10 does not transmit response information.

In this case, in accordance with the plurality of pieces of setting information included in the collective set command, the controller 10 refers to the storage 20 and stores, in the storage 20, each of the setting values in association with a respective one of the hierarchical setting items. The controller 10 then reads out setting values associated with the setting items from the storage 20 and executes settings.

When a collective set command is received, the controller 10 may determine in advance, prior to receiving a response-information request command, whether the collective set command has an error.

When the controller 10 determines in advance that the collective set command has an error, in response to receiving a response-information request command, the controller 10 may immediately transmit response information.

1-4. Response Information

The response information transmitted when the controller 10 determines that the collective set command has an error will be described in detail.

The response information includes the first information and second information. The first information includes information related to setting items of setting information of a collective set command in which the presence of an error has been determined by the controller 10. In addition, the second information includes information related to the error.

The first information may include information related to a setting value of setting information of a collective set command in which the presence of an error has been determined by the controller 10. Furthermore, the first information may also include information on an error factor displayed as a character string that allows even the user to make a determination.

The response information is written in the JSON format and comprises an object, keys, and a value from top-most to bottom-most levels. Depending on the configuration, the response information may be such that a key is omitted despite the presence of an object.

FIG. 4 is a diagram in which examples No. 1 to No. 5 of response information written in the JSON format are arranged in hierarchical order. In the examples, the object is configured with the name "ValueError", and the keys are at a plurality of hierarchical levels with the names "KeyName1", "KeyName2", "KeyName3", "KeyName4", "SetValue", and "Details", from top-most to bottom-most levels. In addition, the value is configured with the name "ErrorCode".

Regarding a received collective set command, "ValueError" refers to the presence of an error in a setting value, "KeyName1", "KeyName2", "KeyName3", and "KeyName4" refer to received setting items that are keys, "SetValue" refers to a received setting value, "Details" refers to an error factor displayed as a character string that allows even the user to make a determination, and "ErrorCode" refers to an error code.

Specifically, the first information of response information is included in "key" illustrated in FIG. 4. "KeyName1", "KeyName2", "KeyName3", and "KeyName4" included in "key" also correspond to hierarchical setting items included in setting information of the received collective set command.

In addition, "key" may also include "SetValue" corresponding to setting values included in the setting information of the received collective set command. Furthermore, "key" may also include "Details" that is an error factor displayed as a character string that allows the user as well as the external device 2 to make a determination. "Details" is generated in accordance with an error determined by the controller 10.

"ErrorCode" is an error code indicating an error factor and is generated based on an error determined by the controller 10. "ErrorCode" is the second information related to the error determined by the controller 10 and is error information for the setting value. "Details" may be included in the second information. In addition, either "ErrorCode" or "Details" may be set as the second information.

FIGS. 5 to 9 depict examples of specific response information transmitted by the communicator 50 when the controller 10 determines that the collective set command has an error. The response information in each of FIGS. 5 to 9 corresponds to that in FIG. 4 and is written in the JSON format, including the first information and the second information.

In FIG. 4, the example of No. 1 corresponds to the example of FIG. 5, the example of No. 2 corresponds to the example of FIG. 6, the example of No. 3 corresponds to the example of FIG. 7, the example of No. 4 corresponds to the example of FIG. 8, and the example of No. 5 corresponds to the example of FIG. 9.

FIG. 5 depicts an example of response information responding to the first setting information included in the collective set command described above with reference to FIG. 2.

"Setting", "TcpIpCfg", "IpV4", and "Ip", which are setting items in the first setting information, are associated with "KeyName1", "KeyName2", "KeyName3", and "KeyName4" as "key" in the response information, respectively. The setting value "0.0.0.0", which is associated with the setting items in the first setting information, is associated with "SetValue" as "key" in the response information.

When the collective set command is received, the controller 10 determines that "Setting", "TcpIpCfg", "IpV4", and "Ip" included in the first setting information are setting items related to communication including the communication item. The controller 10 also determines that "0.0.0.0" is an IP address value to be set for the media processing device 1 and is a communication item value associated with the communication item.

In contrast, the storage 20 stores values for determining that setting information has an error. For example, the storage 20 stores a range of communication item values associated with a communication item related to communication. Specifically, in the storage 20, the range of IP address values associated with "Ip" indicating an IP address is stored, for example, as a range from 0.0.0.1 to 255.255.255.255.

The controller 10 compares "0.0.0.0", which is the received IP address value, with the range of IP address values read from the storage 20. The controller 10 may determine that "0.0.0.0" is out of the range of 0.0.0.1 to 255.255.255.255 and is a wrong value, and may determine that "0.0.0.0" is an error.

When a response-information request command is received, the controller 10 determines whether the received collective set command has an error, and if so, transmits, by the communicator 50, response information. In this example, the controller 10 determines that "0.0.0.0", which is the received IP address value, is an error.

The controller 10 generates response information including "ValueError" as "object", "Setting" as "KeyName1", "TcpIpCfg" as "KeyName2", "IpV4" as "KeyName3", "Ip" as "KeyName4", "0.0.0.0" as "SetValue", "OutOfRange" as "Details", and "100" as "ErrorCode", and transmits this response information.

In such a manner, information from "Setting" to "Ip" included in "key" is included in the first information and corresponds to the setting items of the setting information in which the presence of an error has been determined by the controller 10.

Furthermore, information of "OutOfRange" included in "key" may be included in the first information. "OutOfRange" is displayed as a character string that allows even the user to make a determination, such that it may be determined that "0.0.0.0" is out of the range.

In addition, information of "100" included in "value" is included in the second information related to the error determined by the controller 10. Here, "100" is an error code indicating that "0.0.0.0" is out of range of IP address values related to communication, and enables the external device 2 to perform processing.

"OutOfRange" may be included in the second information. In addition, either "100" or "OutOfRange" may be set as the second information.

In addition, the response information may include, as the first information, at least "Ip" corresponding to the IP address, which is a communication item, and may include, as the second information, at least either of "100", which is error information for "0.0.0.0" corresponding to the communication item value, and "OutOfRange".

When the response information is received, the external device 2 may determine, using "Ip", that the error object is related to the IP address, and may determine, using "100" or "OutOfRange", that the error factor is that the IP address is out of range.

When the response information is received, the external device 2 may determine that the collective set command has an error and what is a factor of the error. In the example in FIG. 5, the user may also determine, using "OutOfRange", that "0.0.0.0" included in the collective set command is out of range. In addition, the external device 2 may determine, using "100", that "0.0.0.0" is out of the range of IP address values related to communication.

In accordance with "100" as the setting value indicating an error code, the IP address value is assumed to be out of range, and therefore the external device 2 may analyze an error factor. Then, the external device 2 may generate a collective set command including a correct IP address value and transmit the generated collective set command to the media processing device 1, so that the IP address value is set.

If the controller 10 determines that the collective set command has no error, the controller 10 may transmit "Null" as response information. Alternatively, the controller 10 may set "Details" and "ErrorCode" to "Null" and transmit "Null" as response information. When "Null" is received, the external device 2 may determine that the collective set command has no error.

FIG. 6 depicts an example of response information responding to the second setting information included in the collective set command described above with reference to FIG. 2.

"Setting", "Print", and "Speed", which are setting items included in the second setting information, are associated with "KeyName1", "KeyName2", and "KeyName3", as "key" in the response information, respectively. The setting value "Level20" associated with the setting items included in the second setting information is associated with "SetValue", as "key" in the response information.

In contrast, the storage 20 stores a range of print speed values, which are setting values associated with the setting item, "Speed", indicating a print speed. Specifically, in the storage 20, the range of print speed values is stored, for example, as a range from "Level5" to "Level15".

The controller 10 compares "Level20", which is the received print speed value, with the range of print speed values read from the storage 20. The controller 10 may determine that "Level20" is out of the range of "Level5" to "Level15" and is a wrong value, and may determine that "Level20" is an error.

In this example, the controller 10 determines that the received "Level20" is an error and generates response information including "ValueError" as "object", "Setting" as "KeyName1", "Print" as "KeyName2", "Speed" as "KeyName3", "Level20" as "SetValue", "OutOfRange" as "Details", and "000" as "ErrorCode", and transmits this response information.

In such a manner, information from "Setting" to "Speed" included in "key" is included in the first information and corresponds to the setting items of the setting information in which the presence of an error has been determined by the controller 10.

Furthermore, information of "OutOfRange" included in "key" may be included in the first information. "OutOfRange" is displayed as a character string that allows even the user to make a determination, such that it may be determined that "Level20" is out of the range.

In addition, information of "000" included in "value" is included in the second information related to the error determined by the controller 10. Here, "000" is an error code indicating that "Level20" is out of range of print speed values related to a print speed, and enables the external device 2 to perform processing.

"OutOfRange" may be included in the second information. In addition, either "000" or "OutOfRange" may be set as the second information.

In addition, the response information may include, as the first information, at least "Speed" corresponding to the print speed, which is a setting item, and may include, as the second information, at least either of "000", which is error information for "Level20" corresponding to the print speed value, and "OutOfRange".

When the response information is received, the external device 2 may determine, using "Speed", that an error object is related to the IP address, and may determine, using "000" or "OutOfRange", that the error factor is the print speed value being out of range.

When the response information is received, the external device 2 may determine that the collective set command has an error and what is a factor of the error.

In the example in FIG. 6, the user may also determine, using "OutOfRange", that "Level20" included in the collective set command is out of range. In addition, the external device 2 may determine, using "000", that "Level20" is out of the range of print speed values related to a print speed.

The external device 2 may analyze an error factor such that, in accordance with "000" as the setting value indicating an error code, the print speed value is out of range. Then, the external device 2 may generate a collective set command including a correct print speed value and transmit the generated collective set command to the media processing device 1, so that the print speed value is set.

If the controller 10 determines that the first setting information and the second setting information included in the collective set command described above with reference to FIG. 2 have errors, the controller 10 may generate one piece of response information including the first information and the second information of each of these pieces of information and transmit the generated response information.

Specifically, the controller 10 generates "ValueError" as the common "object".

Then, as the first information and second information for the first setting information, the controller 10 generates and adds information including "Setting" as "KeyName1" included in "key", "TcpIpCfg" as "KeyName2", "IpV4" as "KeyName3", "Ip" as "KeyName4", "0.0.0.0" as "SetValue", "OutOfRange" as "Details", and "100" as "ErrorCode" included in "value".

Then, the controller 10 generates and adds information including "Setting" as "KeyName1" included in "key", "Print" as "KeyName2", "Speed" as "KeyName3", "Level20" as "SetValue", "OutOfRange" as "Details", and "000" as "ErrorCode" included in "value". Thus, the controller 10 may transmit the resultant information as one piece of response information.

When the one piece of response information in such a manner is received, the external device 2 may determine, using the first information and second information included in the response information, where an error is present and what is a factor of the error even when a plurality of pieces of setting information are included in the collective set command.

FIG. 7 does not depict a collective set command concerned but depicts an example of response information that is transmitted when the controller 10 determines that, among a plurality of pieces of setting information included in the collective set command, setting information related to a network password has an error.

"Setting", "NwCSAuth", and "Password", which are the setting items of setting information related to the network password included in the collective set command, are associated with "KeyName1", "KeyName2", and "KeyName3", as "key" in the response information, respectively. "XXXXX", which is included in the setting information related to the network password and is a password value associated with the password that is a setting item, is associated with "SetValue" as "key" in the response information.

In contrast, the storage 20 stores "YYYYY" that is a password value associated with "Password" indicating a password. "Password" is a setting item related to the network password, and "YYYYY" is a setting value associated with "Password", which is the setting item.

The controller 10 compares "XXXXX", which is the received password value, with "YYYYY", which is the password value read from the storage 20. Because "XXXXX" differs from "YYYYY", the controller 10 may determine that "XXXXX" is a wrong password value, and may determine that "XXXXX" is an error.

In this example, the controller 10 determines that the received "XXXXX" is an error and generates response information including "ValueError" as "object", "Setting" as "KeyName1", "NwCSAuth" as "KeyName2", "Password" as "KeyName3", "XXXXX" as "SetValue", "WrongPassword" as "Details", and "198" as "ErrorCode", and transmits this response information.

In such a manner, information from "Setting" to "Password" included in "key" is included in the first information and corresponds to the setting items of the setting information in which the presence of an error has been determined by the controller 10.

Furthermore, information of "WrongPassword" included in "key" may be included in the first information. "WrongPassword" is displayed as a character string that allows the user as well as the external device 2 to make a determination, such that it may be determined that "XXXXX", which is a password value associated with the password, is wrong.

In addition, information of "198" included in "value" is included in the second information related to the error determined by the controller 10. Here, "198" is an error code indicating that "XXXXX", which is a password value associated with the password, is wrong, and enables the external device 2 to perform processing.

"WrongPassword" may be included in the second information. In addition, either "198" or "WrongPassword" may be set as the second information.

In addition, the response information may include, as the first information, at least "Password" and may include, as the second information, at least either of "198", which is error information for "XXXXX" corresponding to the password value, and "WrongPassword".

When the response information is received, the external device 2 may determine that the collective set command has an error and what is a factor of the error.

In the example in FIG. 7, the external device 2 may determine, using "Password", that an error object is related to the password, and may determine, using "198" or "WrongPassword", that the error factor is a wrong password value.

The external device 2 may generate a collective set command including "YYYYY", which is a correct password value, and transmit the generated collective set command to the media processing device 1, so that the password value is set.

In such a manner, when the response information is received, the external device 2 may determine, using the first information and second information included in the response information, where an error is present and what is a factor of the error even when a plurality of pieces of setting information are included in the collective set command.

FIG. 8 does not depict a collective set command concerned but depicts an example of response information that is transmitted when the controller 10 determines that, among a plurality of pieces of setting information included in the collective set command, setting information related to a network password has an error. Specifically, FIG. 8 depicts an example of response information that the controller 10 generates when setting information related to the network password is not included in the received collective set command.

When setting information related to a network password is not included in the received collective set command, the controller 10 may determine an error related to the network password.

In this example, the controller 10 determines an error in which setting information related to the network password is not included, and generates response information including "ValueError" as "object", "NoPassword" as "Details", and "197" as "ErrorCode", and transmits this response information.

In this case, since the collective set command does not have setting information related to the network password, the response information does not include, for example, keys corresponding to the setting information.

Therefore, the controller 10 generates information of "ValueError", information of "NoPassword" as the first information, and information of "197" included in "value" as the second information related to the error, and transmits the generated information.

"NoPassword" is displayed as a character string that allows even the user to make a determination, such that it may be determined that setting information related to the password is absent. In addition, the information of "197" is an error code indicating the absence of setting information related to a password, and enables the external device 2 to perform processing.

"NoPassword" may be included in the second information. In addition, either "197" or "NoPassword" may be set as the second information.

In addition, the response information may include, as the first information, at least "NoPassword" and may include, as the second information, at least either of "197" and "NoPassword".

When the response information is received, the external device 2 may determine that the collective set command has an error and what is a factor of the error.

In the example in FIG. 8, the external device 2 may determine, using "197" or "NoPassword", that the error factor is the absence of setting information related to the network password.

The external device 2 may generate a collective set command including setting information related to a correct network password and transmit the collective set command to the media processing device 1, so that a network is set.

In such a manner, when the response information is received, the external device 2 may determine, using the first information and second information included in the response information, where an error is present and what is a factor of the error even when a plurality of pieces of setting information are included in the collective set command.

FIG. 9 does not depict a collective set command concerned but depicts an example of response information that is transmitted when the controller 10 determines that an error related to the format of the collective set command including a plurality of pieces of setting information is present.

The storage 20 stores the format of a collective set command. The controller 10 processes the received collective set command according to the format of a collective set command read from the storage 20.

When the received collective set command is not according to the format read from the storage 20, the controller 10 may determine an error.

In this example, the controller 10 determines the presence of an error in the format of the collective set command, and generates response information including "FormatError" as "object" and " " as "ErrorCode" and transmits the response information. In FIG. 4, " " included as "ErrorCode is represented as an empty space. In addition, " " may be "Null".

In this case, since an error is present in the format of the collective set command, the response information does not include, for example, "key" corresponding to the setting information.

Therefore, the controller 10 generates information of "FormatError" as the first information and information of " " included in "value" as the second information related to the error, and transmits the generated information.

"FormatError" is displayed as a character string that allows even the user to make a determination, such that it may be determined that an error is present in the format of the collective set command. In addition, the information of " " is an error code indicating that an error is present in the format of the collective set command, and enables the external device 2 to perform processing.

"FormatError" may be included in the second information. In addition, either " " or "FormatError" may be set as the second information.

In addition, the response information may include, as the first information, at least "FormatError" and may include, as the second information, at least either of " " and "FormatError".

When the response information is received, the external device 2 may determine that the collective set command has an error and what is a factor of the error.

In the example in FIG. 9, the external device 2 may determine, using " " or "FormatError", that the error factor is an error in the format of the collective set command.

The external device 2 may generate a collective set command in a correct format and transmit the generated collective set command to the media processing device 1, so that settings are made.

In such a manner, when the response information is received, the external device 2 may determine, using the first information and second information included in the response information, where an error is present and what is a factor of the error even when a plurality of pieces of setting information are included in the collective set command.

In accordance with the media processing device 1 and the method for controlling the media processing device 1 according to the first embodiment described above, in response to receiving, by the communicator 50, a response-information request command, the controller 10 determines whether the received collective set command has an error, and if so, transmits, by the communicator 50, response information.

The collective set command includes a plurality of pieces of setting information, each of which includes setting items related to settings of the media processing device 1 and setting values associated with the setting items. When the controller 10 determines that setting information has an error, the response information includes, regarding the setting information related to the error, a setting item, as the first information, and error information for the setting value, as the second information.

When response information is received, the external device 2 may determine, using the first information and second information included in the response information, where an error is present and what is a factor of the error even when a plurality of pieces of setting information are included in the collective set command. The external device 2 may then correct the setting information of the collective set command and transmit the corrected collective set command to the media processing device 1, so that settings are made.

Although these embodiments have been described above in detail with reference to the drawings, specific configurations are not limited to the embodiments, and changes, replacements, deletions, and so on may be made without departing from the scope of the disclosure.

For example, the head of the media processing device 1 has been described using an example of a thermal head; however, there are no restrictions on the printing method. The head may be an ink jet head. In this case, the recording paper is regular paper. The medium may be a check, ledger sheet, or the like.

What is claimed is:

1. A media processing device comprising:
a communicator communicable with an external device, wherein
the media processing device is configured to:
receive a first command including a plurality of pieces of setting information, the setting information including a setting item related to a setting and a setting value associated with the setting item,
determine whether the first command has an error, and
transmit response information including first information related to the setting item of the first command determined to have the error and second information related to the error in response to receiving a second command when it is determined that the first command has the error.

2. The media processing device according to claim 1, wherein the first information and the second information of the response information are information written in a JavaScript Object Notation (JSON) format.

3. The media processing device according to claim 1, wherein the media processing device is configured to transition to a setting mode which enables a setting based on the setting information of the first command in response to receiving a third command.

4. The media processing device according to claim 1, wherein
the setting information of the first command includes a password as the setting item and a password value associated with the password as the setting value, and
the response information includes the password as the first information and error information for the password value as the second information.

5. The media processing device according to claim 1, wherein
the setting information of the first command includes a print speed as the setting item and a print speed value associated with the print speed as the setting value, and
the response information includes the print speed as the first information and error information for the print speed value as the second information.

6. The media processing device according to claim 1, wherein
the setting information of the first command includes a communication item as the setting item and a communication item value associated with the communication item as the setting value, and
the response information includes the communication item as the first information and error information for the communication item value as the second information.

7. A method for controlling a media processing device including a communicator communicable with an external device, the method comprising:
receiving a first command including a plurality of pieces of setting information, the setting information including a setting item related to a setting and a setting value associated with the setting item;
determining whether the first command has an error; and
transmitting response information including first information related to the setting item of the first command determined to have the error and second information related to the error in response to receiving a second command when it is determined that the first command has the error.

8. The method according to claim 7, wherein the first information and the second information of the response information are information written in a JavaScript Object Notation (JSON) format.

9. The method according to claim 7 further comprising:
transitioning to a setting mode which enables a setting based on the setting information of the first command in response to receiving a third command.

10. The method according to claim 7, wherein
the setting information of the first command includes a password as the setting item and a password value associated with the password as the setting value, and
the response information includes the password as the first information and error information for the password value as the second information.

11. The method according to claim 7, wherein
the setting information of the first command includes a print speed as the setting item and a print speed value associated with the print speed as the setting value, and
the response information includes the print speed as the first information and error information for the print speed value as the second information.

12. The method according to claim 7, wherein
the setting information of the first command includes a communication item as the setting item and a communication item value associated with the communication item as the setting value, and
the response information includes the communication item as the first information and error information for the communication item value as the second information.

* * * * *